US005085931A

United States Patent [19]

Boyer, III et al.

[11] Patent Number: 5,085,931

[45] Date of Patent: Feb. 4, 1992

[54] MICROWAVE ABSORBER EMPLOYING ACICULAR MAGNETIC METALLIC FILAMENTS

[75] Inventors: Charles E. Boyer, III; Eric J. Borchers; Richard J. Kuo; Charles D. Hoyle, all of St. Paul, Minn.

[73] Assignee: Minnesota Mining and Manufacturing Company, St. Paul, Minn.

[21] Appl. No.: 547,397

[22] Filed: Jul. 3, 1990

Related U.S. Application Data

[63] Continuation of Ser. No. 302,427, Jan. 26, 1989, abandoned.

[51] Int. Cl.[5] .......... B32B 5/16; H01B 1/02; H01C 00/00

[52] U.S. Cl. .......... 428/328; 428/338; 252/513; 342/1; 342/4; 342/5

[58] Field of Search .......... 428/328, 338; 252/513; 342/1, 2, 3, 4, 5, 6, 7, 8, 9, 10, 11, 12

[56] References Cited

U.S. PATENT DOCUMENTS

| | | | |
|---|---|---|---|
| 3,007,160 | 10/1961 | Halpern | 343/18 |
| 3,240,621 | 3/1966 | Flower et al. | 117/93.2 |
| 3,526,896 | 9/1970 | Wesch | 343/18 |
| 3,742,176 | 6/1973 | Ishino et al. | 219/10.55 |
| 3,806,928 | 4/1974 | Costanza | 343/18 A |
| 3,843,593 | 10/1974 | Shell et al. | 260/40 R |
| 3,865,627 | 2/1975 | Roden et al. | 117/240 |
| 3,866,009 | 2/1975 | Ishino et al. | 219/10.55 |
| 3,938,152 | 2/1976 | Grimes et al. | 343/18 A |
| 3,951,904 | 4/1976 | Tomonaga | 260/40 R |
| 4,003,840 | 1/1977 | Ishino et al. | 252/62 |
| 4,024,318 | 5/1977 | Forster et al. | 428/519 |
| 4,034,375 | 7/1977 | Wallin | 428/110 X |
| 4,046,983 | 9/1977 | Ishino et al. | 219/10.55 |
| 4,116,906 | 9/1978 | Ishino et al. | 260/22 A |
| 4,153,661 | 5/1979 | Ree et al. | 264/120 |
| 4,173,018 | 10/1979 | Dawson et al. | 343/18 A |
| 4,408,255 | 10/1983 | Adkins | 361/382 |
| 4,414,339 | 11/1983 | Solc et al. | 524/431 |
| 4,538,151 | 8/1985 | Hatakeyama et al. | 343/18 A |
| 4,606,848 | 8/1986 | Bond | 524/496 |
| 4,626,642 | 12/1986 | Wang et al. | 219/10.55 |
| 4,664,971 | 5/1987 | Soens | 428/288 |
| 4,690,778 | 9/1987 | Narumiya et al. | 252/506 |
| 4,776,086 | 10/1988 | Kasevich et al. | 439/578 |
| 4,785,148 | 11/1988 | Mayer | 219/10.55 |
| 4,814,546 | 3/1989 | Whitney et al. | 174/36 |
| 4,822,673 | 4/1989 | Umemura | 428/328 |
| 4,906,497 | 3/1990 | Hellmann et al. | 428/49 |
| 4,952,448 | 8/1990 | Bullock et al. | 428/328 X |
| 4,962,000 | 10/1990 | Emslander et al. | 428/461 |

OTHER PUBLICATIONS

"Ram Maintenance Procedures (Interim)," U.S. Navy, Oct. 1985.

Ruck et al., "Radar Cross Section Handbook," vol. 2, pp. 617-622, Section 8.3.2.1.1.3, Plenum Press 1970.

David L. Dye et al., "Theoretical Investigation of Fibers," Boeing Aerospace Company, Seattle, Washington, draft report for Department of Defense Contract DAAK11-82-C-0152, 1983.

Dye et al., "Theoretical Investigation of Fibers," Boeing Aerospace Co., Seattle, Washington, draft report for DOD Contract DAAK11-82-C-0152, 1983.

*Primary Examiner*—George F. Lesmes
*Assistant Examiner*—Terrel Morris
*Attorney, Agent, or Firm*—Gary L. Griswold; Warren R. Bovee; Peter Forrest

[57] ABSTRACT

An electromagnetic radiation absorber is formed by dispersing into a dielectric binder acicular magnetic metallic filaments with an average length of about 10 micron or less, diameters of 0.1 micron or more, and aspect (length/diameter) ratios between 10:1 and 50:1. Preferably the average length is about 5 micron, the aspect ratios are between 10:1 and 25:1, and the dielectric binder is polymeric. The volume fraction of the filaments may be lower than 35% of the total and still provide satisfactory absorption. An absorbing paint is formed by dissolving the absorber in a base liquid. The absorber or absorbing paint may be applied to a conductive surface, such as a metallic wire, plate or foil. Impedance matching materials are preferred but not required.

26 Claims, 3 Drawing Sheets

MICROWAVE ABSORBER EMPLOYING ACICULAR MAGNETIC METALLIC FILAMENTS

This is a continuation of application Ser. No. 302,427 filed Jan. 26, 1989, now abandoned.

TECHNICAL FIELD

This invention involves electromagnetic radiation absorbers which comprise magnetic metallic filaments embedded in dielectric binders.

BACKGROUND

Electromagnetic radiation absorbers typically are non-conductive composites of one or more kinds of dissipative particles dispersed through dielectric binder materials. The absorption performance of the composite absorber depends predominantly on the electromagnetic interactions of the individual particles with each other and with the binder. For example, Hatakeyama et al. U.S. Pat. No. 4,538,151 discloses an absorber comprising a mixture of: metal or alloy fibers having high electric conductivity, a length from 0.1 mm (100 microns) to 50 mm and a length to diameter ratio ("aspect ratio") larger than 10; ferrite or a ferromagnetic material; a high molecular weight synthetic resin; and, optionally, carbon black.

The term "whiskers" is often used confusingly for both monocrystalline and polycrystalline fibers. For this invention, relatively long fibers are called acicular ("needle-like") whiskers if monocrystalline in structure, or acicular filaments if polycrystalline.

Thickness, weight, and ease of application of the composite absorber are important practical considerations. Accordingly, absorbing paints have also been developed for certain applications. The paints are typically dispersions of the metal/binder composites. For example, Bond U.S. Pat. No. 4,606,848 teaches a paint comprising stainless steel, carbon, or graphite fibers in polyurethane, alkyd, or epoxy binders. The fibers range in length from 10 micron to 3 cm (30,000 micron) as the diameter ranges from 0.01 micron to 30 micron, thus the aspect ratio is a constant 1000.

SUMMARY OF INVENTION

The invention is a non-conductive microwave radiation absorber, comprising acicular magnetic metallic filaments with an average length of about 10 microns or less, a diameter of about 0.1 micron or more, and aspect ratios between 10:1 and 50:1. The filaments are dispersed in a dielectric binder. An absorbing paint may be formed by dispersing the filaments into a base liquid, such as by dissolving the filament/binder dispersion in the base liquid. The absorber or the paint may be applied to a conductor such as a metal foil, plate or wire.

DETAILED DESCRIPTION

Figure 1:
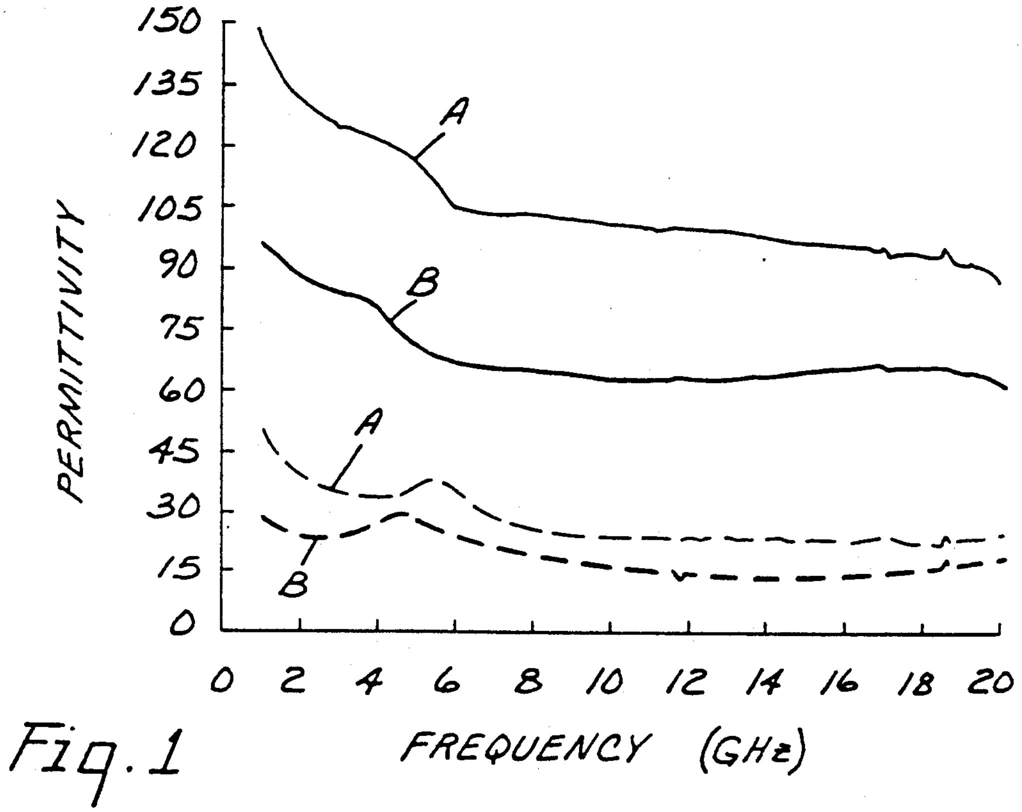
FIGS. 1–4 are graphs of the real and imaginary parts of the permittivity and permeability of four embodiments of the invention, as a function of incident radiation frequency.
Figure 2:
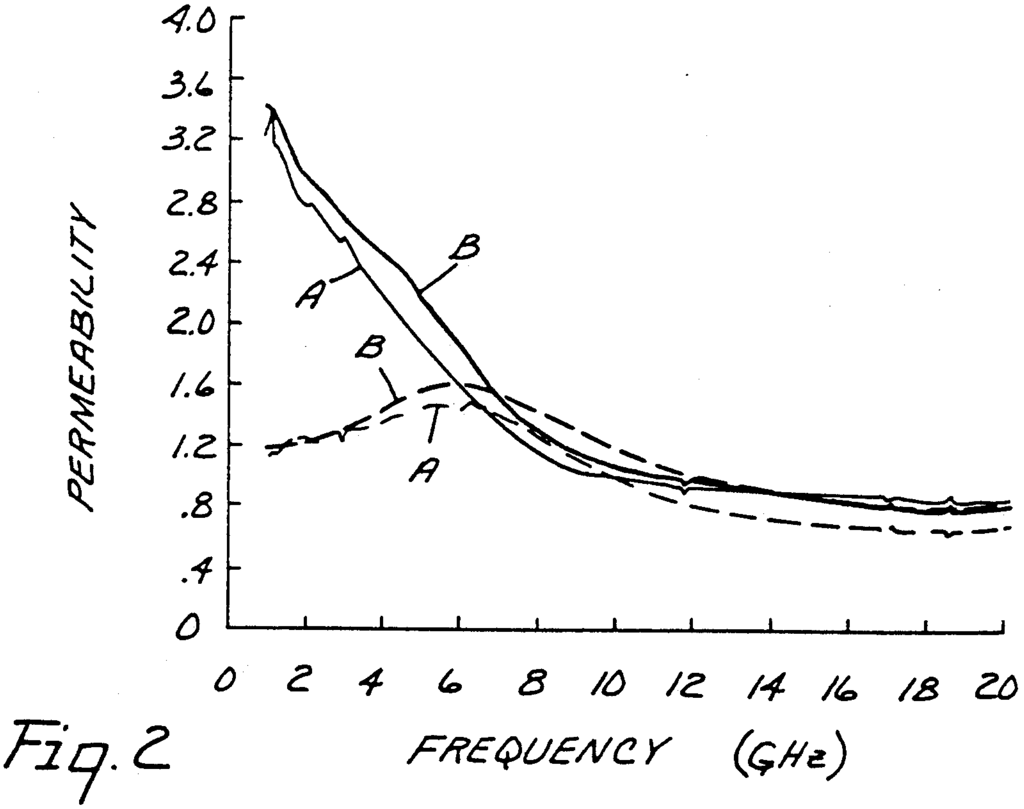
Figure 3:
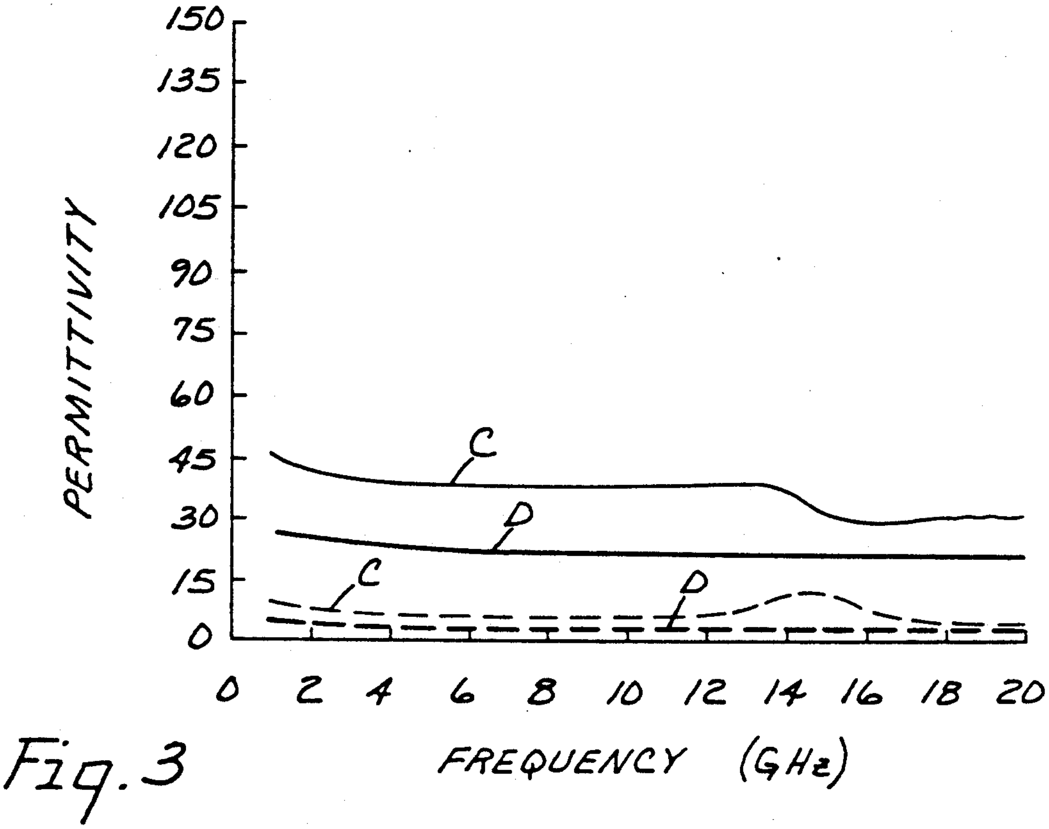
Figure 4:
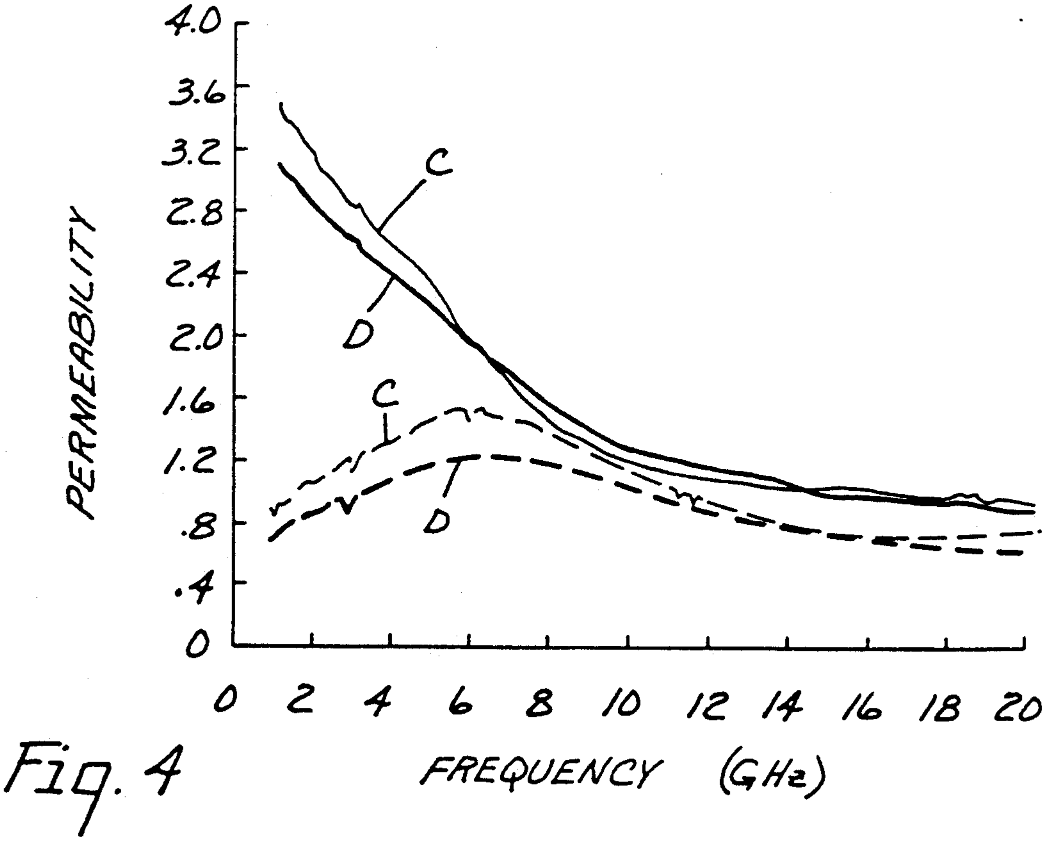

One embodiment of the invention is a non-conductive composite absorber having at least two major components. The first component is acicular magnetic metallic polycrystalline filaments (or simply "filaments") having an average length of less than about 10 micron, a diameter greater than about 0.1 micron, and length to diameter ratios ("aspect ratios") between 10:1 and 50:1. The second component is dielectric binder in which the filaments are dispersed, and which contributes to the absorption performance of the composite absorber.

Another embodiment of the invention is an absorbing paint for direct application to either a conductive or insulating surface. This embodiment may be made by dispersing either the filaments themselves into a base liquid, or by forming a pigment comprising the composite absorber and dissolving the pigment in a base liquid. In either case the paint must remain non-conductive. For this reason, dissolving the composite absorber pigment is preferred, as the dielectric binder substantially surrounds the filaments and prevents them from electrical contact with each other. If an absorber is used as a pigment, a polymeric binder material is preferred for ease of preparation and use, although the choice of binder depends on the choice of base liquid.

Another embodiment of the invention includes a conductor adjacent the composite absorber. The conductor may be an object which the absorber is designed to shield, or it may be a conductive layer intended to promote microwave absorption.

To form an effective absorbing structure, the composite should be in a form which has a thickness in the direction of radiation propagation greater than about one-fortieth (2.5 percent) of the wavelength to be absorbed. The composites of this invention absorb radiation over a broad incident frequency range in the microwave region of approximately 2 to 20 GHz, implying a thickness greater than about 0.0375 cm.

Also for any embodiment of the invention, impedance matching of the absorber to the incident medium (usually air) is preferred but not required. Typically the match is done by a material having permeability and permittivity values that minimize reflection of microwaves at the surface of incidence. Usually a layer of such impedance matching material is added to the absorber or dried absorbing paint, and the dimensions, weight, etc. of the layer are considered in the complete design.

All the embodiments employ magnetic metallic polycrystalline filaments. Presently available filaments typically range in length from 50–500 microns and in diameter from 0.1 to 0.5 microns; to preserve the filament shape, the aspect ratios generally are maintained between 500:1 to 1000:1. These filaments can be shortened for use in the invention by milling and grinding. The average sizes of the filaments may be determined from individual measurements performed with a scanning electron microscope.

The reduction in length of the magnetic metallic filaments broadens the absorption performance of the composite material in which they are embedded. Long filaments produce only narrowband absorption response because of their conductivity, although it is generally stronger than that of, for example, the carbonyl iron spheres known in the art, due to the dipole moments of the filaments. However, the shortened, low aspect ratio magnetic metallic filaments used in the present invention produce effective and versatile absorbers, exhibiting strong absorption magnitude over a broad frequency range. We believe at this time that the dissipative performance of the filaments is due in part to the magnetic and metallic natures of the filaments, in addition to their length and aspect ratio.

Also, the inventive absorber has a reduced volume loading factor (absorbing particle volume as a percentage of total absorber volume), which leads to a reduction in weight of the final product. For example, volume loading factors for composites based on carbonyl iron microspheres typically range from 40 to 65 percent. In the present invention, the volume loading may be as low as 25 to 35 percent with no decrease in absorption performance.

The reduced acceptable volume loading factor also helps ensure that the composite absorber is an insulator, i.e., it has a high bulk resistivity, despite the conductivity of the individual filaments. If the bulk resistivity is too low, the composite absorber effectively becomes a conductive sheet, which reflects microwaves instead of absorbing them. The resistivity of iron, for example, is about $10^{-5}$ ohm-cm at room temperature. Insulators typically have bulk resistivities of $10^{12}$ ohm-cm or more. Samples of the invention with 25 percent volume loading of iron filaments have measured bulk resistivity of approximately $1.5\times10^{13}$ ohm-cm at room temperature, indicating an insulator.

Several types of filaments may be used in the invention. Iron, nickel, and cobalt filaments are suitable, as are their alloys. For example, iron-nickel, nickel-manganese, and iron-chromium alloys are acceptable, if they form acicular magnetic metallic polycrystalline filaments of the proper size. More than one type of filament may be used in a single absorber, and other absorbing materials (e.g., carbonyl iron) may be added to the composite material to tailor the absorption versus frequency characteristics to a particular application.

The dielectric binder may be ceramic, polymeric, or elastomeric. Ceramic binders are preferred for applications requiring exposure to high temperatures, while polymeric and elastomeric binders are preferred for their flexibility and lightness.

Many polymeric binders are suitable, including polyethylenes, polypropylenes, polymethylmethacrylates, urethanes, cellulose acetates, epoxies, and polytetrafluoroethylene (PTFE). The polymeric binder may be a thermosetting polymer, a thermoplastic polymer, or a conformable polymer which changes shape to assume a final applied configuration. For example, a heat-shrinkable binder may be formed from cross-linked or oriented crystallizable materials such as polyethylene, polypropylene, and polyvinylchloride; or from amorphous materials such as silicones, polyacrylates, and polystyrenes. Solvent-shrinkable or mechanically stretchable binders may be elastomers such as natural rubbers or synthetic rubbers such as reactive diene polymers; suitable solvents are aromatic and aliphatic hydrocarbons. Specific examples of such materials are taught in copending Whitney et al. U.S. patent application Ser. No. 07/125,597, filed Nov. 11, 1987, now U.S. Pat. No. 4,814,546.

Suitable elastomeric binders are natural rubbers and synthetic rubbers, such as the polychloroprene rubbers known by the trade name "NEOPRENE."

The binder may be homogenous, or a matrix of interentangled fibrils, such as the PTFE matrix taught in Ree et al. U.S. Pat. No. 4,153,661.

An electrical conductor with a microwave absorbing coating may be made by extruding a composite absorber onto the conductor. Many polymeric binders are suitable for extrusion, especially polyvinylchlorides, polyamides, and polyurethanes. The conductor may be a wire, cable, or conductive plate.

The exact choice of binder depends on the final absorption versus frequency characteristics desired and the physical application required. The choice of binder also dictates the procedure and materials required to assemble the composite absorber, paint, or coated conductor. The basic procedures are illustrated by the following examples.

EXAMPLE 1

Four samples of the invention, labeled A-D, were prepared, differing only in the lengths of filaments produced. In each sample, 100 parts by weight of commercially available iron filaments, typically 50–200 microns in length and 0.1 to 0.5 microns in diameter, were wetted with methylethylketone and pulverized to shorter lengths in a high speed blade mixer for one hour. After the shortened filaments settled, the excess solvent was decanted away. The filaments were milled again, in methylethylketone with 800 grams of 1.3 millimeter diameter steel balls at 1500 revolutions per minute in a sand mill supplied by Igarashi Kikai Seizo Company Ltd. Each of the four samples was milled for a different amount of time. The milling times were: Sample A, 15 minutes; Sample B, 30 minutes; Sample C, 60 minutes; and Sample D, 120 minutes.

Inspection of the milled particles by scanning electron microscopy (SEM) showed that some individual filaments were pressed together into larger particles. This effect was most pronounced in Sample D. Generally, the filaments were not pressed together end-to-end as much as they were pressed together to form wider filaments. No attempt was made to separate these pressed filaments, and their lengths and diameters were measured as if they were single filaments. SEM also confirmed that the filaments were not aligned in any preferred direction.

The distributions of filament length in microns as a percentage of total filaments measured for each sample is shown in Table I. The percentages do not add to 100 due to rounding. Approximately 150 filaments were measured for each sample.

TABLE I

| | Percentage of Total Filaments by Sample | | | |
|---|---|---|---|---|
| Size Range | A | B | C | D |
| 0–5 | 60 | 74 | 82 | 99 |
| 5–10 | 30 | 17 | 9 | 1 |
| 11–15 | 6 | 6 | 5 | 0 |
| 16–20 | 2 | 1 | 2 | 0 |
| 21–25 | 1 | 1 | 1 | 0 |
| 26–50 | 1 | 1 | 2 | 0 |
| 51–100 | 1 | 1 | 0 | 0 |
| 101–150 | 0 | 0 | 0 | 0 |
| 151–200 | 0 | 0 | 0 | 0 |

The longest length, average length, average diameter, and aspect ratio of the samples are shown in Table II, the first three measured in microns. The average length calculation used the average length of each size range, weighted by the percentage distribution in each size range.

TABLE II

| | Sample | | | |
|---|---|---|---|---|
| | A | B | C | D |
| Longest Length | 55 | 60 | 35 | 10 |
| Avg. Length | 6.2 | 5.4 | 4.7 | 2.6 |
| Avg. Diameter | 0.25 | 0.25 | 0.25 | 0.25 |
| Aspect Ratio | 24.8 | 21.6 | 18.8 | 10.4 |

The diameters of the filaments were essentially unchanged by the milling, i.e., they ranged from 0.1 to 0.5 microns. Because Table 1 shows that substantially all of the filaments in the samples have lengths of 10 microns or less, the diameter range of 0.1 to 0.5 microns implies that the filaments in each sample have aspect ratios between 20:1 and 50:1. The preferred aspect ratio range is 10:1 to 25:1, using the average length and diameter values of Table 2.

For each sample, a paint containing the milled filaments was made from two major components. The first component was (by weight) 198.0 parts of methylethylketone, 50.0 parts of toluol, 43.6 parts of a polyurethane ("ESTANE" type 5703 supplied by B. F. Goodrich Company), and 2.5 parts of a suitable dispersing agent ("GAFAC" type RE-610 supplied by GAF Corporation). This component was stirred until the polyurethane dissolved. The second component was (by weight) 100 parts of the shortened iron filament samples, 2.7 parts of diphenylmethane diisocyanate, and 1.8 parts of propylene glycol methylether acetate. The two components were mixed in a blade mixer to form a homogeneous paint. Each mixture was degassed and cast onto a flat surface, then allowed to dry in air to remove the volatile vehicle chemicals.

After sufficient drying and curing (about 1-3 days), the resulting radiation absorber was machined into circular toroidal ("donut-shaped") samples for coaxial microwave absorption measurements. The inner and outer diameters of the sample were 3.5±0.0076 mm and 7.0±0.0076 mm, respectively. Each sample was placed, at a position known to ±0.1 mm, in a 6 cm long coaxial airline connected to a Hewlett-Packard Model 8510A precision microwave measurement system. The substrates used had a permittivity of 2.58 and a permeability of 1.00.

Two hundred one step mode measurements from 0.1 to 20.1 GHz were made on each sample. Measurements of the transmission and reflection of the microwaves by the samples were used to calculate the real and imaginary parts of the permittivities and permeabilities of the samples as a function of incident frequency, as shown in FIGS. 1-4. The errors in the calculation of the imaginary parts of the permittivity and permeability are typically 5 percent of the measurement. In FIGS. 1-4, the real parts are solid lines and the imaginary parts are dashed lines. The letters A-D identify the values from Samples A-D.

FIGS. 1-4 show that filament length strongly affects both the real and imaginary parts of permittivity. The real part of the permittivity decreases significantly faster than the imaginary part, thus the ratio of the imaginary part to the real part (a measure of the absorption ability of the composite) increases with decreasing filament length. The effect of the varying filament length on the measured absorber permeability is generally weak, but in Sample D the imaginary part of the permeability shows a significant decrease compared to that of Samples A-C, especially at low frequencies. For this reason, Sample C (average filament length about 5 microns) is preferred, although each of the samples is an acceptable microwave absorber.

Based on our data and the known performance of absorbers employing much longer filaments (e.g., the greater than 100 micron filaments of U.S. Pat. No. 4,538,151), we believe the improved performance of the present invention lies in part in the use of filaments with an average length of 10 micron or less, preferably about 5 micron, diameter greater than about 0.1 micron, and aspect ratios between 50:1 and 10:1, preferably between 25:1 and 10:1.

EXAMPLE 2

A stock formulation containing iron filaments was made as follows. First, 52.49 grams of synthetic rubber ("NEOPRENE" type W as supplied by E. I. du Pont de Nemours Company) was banded on a two roll rubber mill and mixed for five minutes to reach an elastic phase. Then 0.52 grams benzothiazyl disulfide, 13.12 grams stearic acid, and 2.62 grams white mineral oil were added, and mixing continued for another five minutes. After 147.38 grams of commercial length iron filaments were added, mixing continued until the average length of the filaments was approximately 6.5 microns and the average diameter approximately 0.26 microns, for an aspect ratio of 25:1. Next a curing accelerator was made, comprising 0.26 grams hexamethylenetetramine, 0.26 grams tetramethylthiuram disulfide, and 0.52 grams polyethylene glycol. The accelerator was mixed into the iron filament/binder mixture to produce the stock formulation. The volume loading of the filaments into the binder was determined to be 35%. To reduce premature cure, the stock formulation was kept below 30° C.

A thin calipered sheet of the stock formulation was dissolved in a base mixture of equal parts butylacetate and toluene, followed by agitation for two hours. This formed a paint designated Sample E. A 16.5 cm square aluminum plate was repeatedly sprayed with thin coats of the paint, allowing typically 15 to 30 minutes drying time between each spraying. To keep the solid content of the paint at approximately 15% by volume, the same butylacetate/toluene base mixture was thinned into the paint as needed. Once a final sprayed thickness of about 1 mm was reached, the coat was allowed to dry and cure at room temperature for three days.

Figure 5:
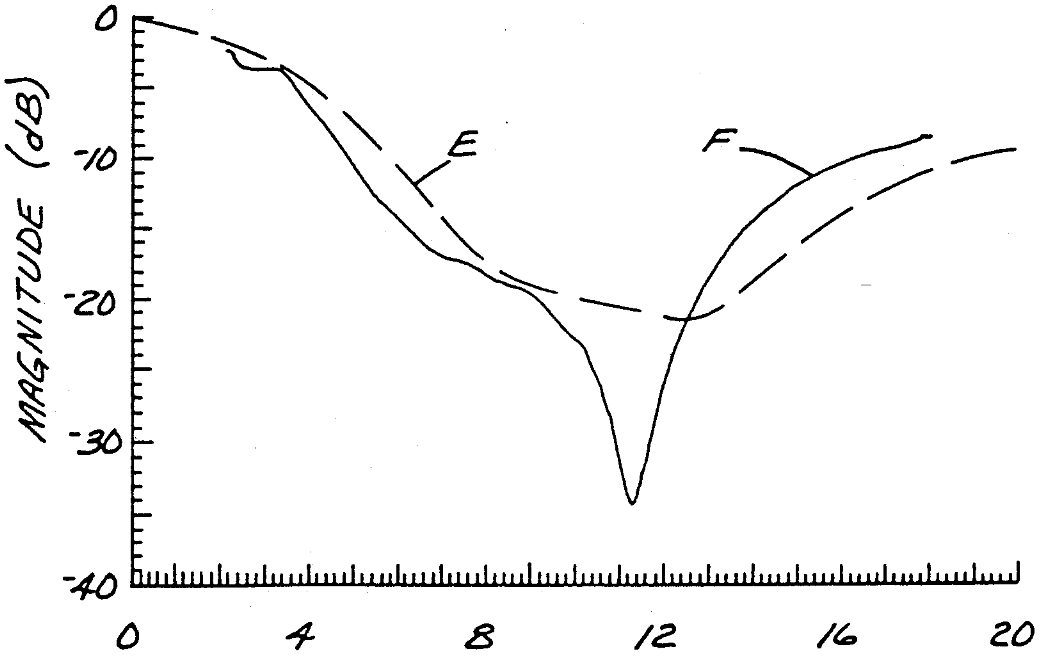
FIG. 5 is a graph of the predicted absorption response of one embodiment of the invention, and of the actual absorption response of another embodiment of the invention, as a function of incident radiation frequency.

The coated aluminum plate was mounted in a measurement chamber with microwave radiation normally incident on the coated side. Actual measurements of the transmission and reflection coefficients were used to calculate the predicted absorption for transverse magnetic (TM) radiation incident upon the plate at a 65° angle from normal, as a function of incident frequency. The predicted results are graphed in FIG. 5 and show the desired broad and strong absorption response, at least 10 dB over a 13 GHz range from 6 to 19 GHz and at least 20 dB over a 3 dB wide range from 10.5 to 13.5 GHz.

A paint designated Sample F was made by the same procedures as for Sample E above with the following ingredients: "NEOPRENE" Type W, 69.99 grams; benzothiazyl disulfide, 0.70 gram; stearic acid, 17.50 grams; white mineral oil, 3.50 grams; iron filaments, 196.50 grams; hexamethylenetetramine, 0.35 gram; tetramethylthiuram disulfide, 0.35 gram; polyethylene glycol, 0.70 gram. The volume loading of the iron filaments was 25%. After painting the conductive plate, actual measurements were made of the absorption coefficient for TM radiation incident upon the plate at a 65° angle from normal, as a function of incident frequency. The results are also graphed in FIG. 5 and confirm the desired broad and strong absorption response, at least 10 dB over a 11 GHz range from 5 to 16 GHz, at least 20 dB over a 3.5 dB wide range from 9 to 12.5 GHz, and at least 30 dB over a 1 dB wide range from 10.6 to 11.6 GHz.

EXAMPLE 3

Figure 6:
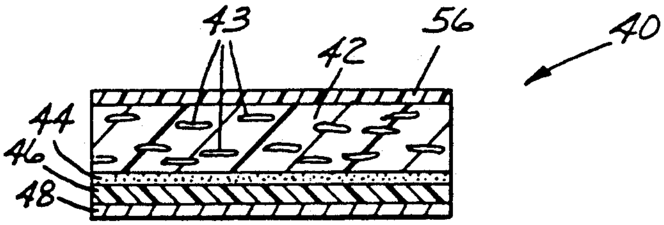
FIG. 6 is a cross sectional view of another embodiment of the invention.

The construction shown schematically in FIG. 6 was made as follows. Iron filaments 43 were dispersed in a 1.2 mm thick calipered sheet 42 made from the stock formulation which was used to form Sample E of Example 2. A conductive layer 48 of aluminum, vapor coated on one side of a polyester support sheet 46, was adhered to sheet 42 with an ethylene acrylic acid (EAA) type internal adhesive 44 between the polyester support sheet 46 and the stock formulation 42. This produced a radiation absorber/conductive metal layer construction, sometimes known as a Dallenbach construction.

In another sample, aluminum foil, 0.0085 mm thick, was used for conductive layer 48 and applied directly to an absorbing sheet of the same composition without a polyester support 46. The polyester support 46 for the vapor coated aluminum also would not be required if the internal adhesive 44 adheres to both conductive layer 48 and absorbing sheet 42. Several types of internal adhesives 44 may be used, depending on the choice of materials made in constructing the tile and the conditions in which it will be applied. Any conductive metal is suitable for the conductive layer 48.

In fact, for some choices of binder material, the absorbing composite may be coated directly on the conductive layer without any internal adhesive at all. For example, an absorbing paint could be made and applied to a suitable conductive layer, as in Example 2.

In this embodiment as in any embodiment of the invention, an impedance matching layer 56 is preferred but not required. Suitable materials for this layer include polymeric materials with high volumes of trapped air, such as air-filled glass microbubbles embedded in the binder materials described above.

EXAMPLE 4

An absorber comprising iron filaments in a matrix of interentangled polytetrafluoroethylene (PTFE) fibrils was made according to the process of Ree et al. U.S. Pat. No. 4,153,661. A water-logged paste of 10.0 grams of iron filaments and 4 cc of an aqueous PTFE dispersion (5.757 grams of PTFE particles) was intensively mixed at about 75° C., biaxial calendered at about 75° C., and dried at about 75° C. The lengths of the filaments were reduced by the mixing and calendering steps to an estimated range of 1 to 10 microns. The volume loading of the whiskers in the total volume of the absorber was calculated to be 32.7 percent. Measurements of the real and imaginary parts of the permeability indicated that the real part decreased from about 4.0 to about 1.5 over a 2 GHz to 8 GHz range; the imaginary part was greater than 1.0 over the entire range of 2 GHz to 20 GHz, and about 2.0 in the range of 5 GHz to 8 GHz.

While certain representative embodiments and details have been shown to illustrate this invention, it will be apparent to those skilled in this at that various changes and modifications may be made in this invention without departing from its full scope, which is indicated by the following claims.

We claim:

1. An insulating microwave radiation absorber which comprises acicular poly-crystalline magnetic metallic filaments having an average length of about 10 microns or less, diameters of about 0.1 micron or more, and aspect ratios between 50:1 and 10:1, dispersed in a dielectric binder; whereby the dimensions and magnetic and metallic natures of the filaments enable the absorber to absorb radiation in the microwave region of approximately 2 to 20 GHz.

2. The absorber of claim 1 in which the filaments have an average length of about 5 microns.

3. The absorber of claim 1 in which the filaments have aspect ratios between 25:1 and 10:1.

4. The absorber of claim 1 in which the metallic magnetic filaments are chosen from the group consisting of iron, nickel, cobalt, and their alloys.

5. The absorber of claim 1 in which the dielectric binder is ceramic.

6. The absorber of claim 1 in which the dielectric binder is polymeric.

7. The absorber of claim 6 in which the polymeric binder comprises a polymer chosen from the group consisting of thermosetting polymers and thermoplastic polymers.

8. The absorber of claim 6 in which the polymeric binder comprises a polymer chosen from the group consisting of polyethylenes, polypropylenes, polymethylmethacrylates, urethanes, cellulose acetates, and polytetrafluoroethylene.

9. The absorber of claim 1 in which the dielectric binder is elastomeric.

10. The absorber of claim 1 in which the volume loading of the filaments is 35 percent or less.

11. The combination of the absorber of claim 1 and an impedance matching material.

12. An insulating microwave radiation absorbing paint comprising:

(a) a pigment comprising the absorber of claim 1, and
(b) a base liquid into which the pigment is dissolved.

13. The paint of claim 12 in which the base liquid is a mixture of butylacetate and toluene.

14. A conductor coated with the absorber of claim 1.

15. The coated conductor of claim 14 in which the absorber and conductor are adhered together in a layered sheet.

16. The sheet of claim 15 further comprising an impedance matching layer.

17. The coated conductor of claim 14 characterized by an absorption after coating of at least 10 dB over a band which includes 12 GHz and which is at least 12 GHz wide.

18. The coated conductor of claim 17 characterized by an absorption of at least 20 dB at some frequency within the band.

19. The conductor of claim 18 characterized by an absorption of at least 20 dB over a band which is at least 3 GHz wide.

20. A method of making an insulating microwave radiation absorber, comprising the steps of:

(a) forming acicular poly-crystalline magnetic metallic filaments with an average length of about 10 microns or less, diameters ob about 0.1 micron or more, and aspect ratios between 50:1 and 10:1;

(b) dispersing the filaments of step (a) in a dielectric binder;

whereby the dimensions and magnetic and metallic natures of the filaments enable the absorber to absorb radiation in the microwave region of approximately 2 to 20 GHz.

21. The method of claim 20 further comprising the step of:

(c) dissolving the result of step (b) in a base liquid.

22. The method of claim 20 further comprising the step of:

(c) applying the result of step (b) to a conductor.

23. The method of claim 22 in which step (c) comprises using an adhesive to adhere the result of step (b) to the conductor.

24. The method of claim 22 in which step (c) comprises extruding the result of step (b) onto the conductor.

25. The method of claim 20 further comprising the step of:

(c) adding an impedance matching material to the result of step (b).

26. The absorber of claim 6 in which the polymeric binder comprises a polymer chosen from the group consisting of heat-shrinkable polymers, solvent-shrinkable polymers, and mechanically-stretchable polymers.

* * * * *